United States Patent [19]

Horak

[11] 3,997,222
[45] Dec. 14, 1976

[54] LID CONTROL APPARATUS FOR DOCUMENT PROCESSING EQUIPMENT

[75] Inventor: Anthony Horak, Detroit, Mich.

[73] Assignee: Burroughs Corporation, Detroit, Mich.

[22] Filed: Apr. 28, 1975

[21] Appl. No.: 572,216

[52] U.S. Cl. .............................. 312/319; 292/263; 220/335; 217/60 R
[51] Int. Cl.² ........................................ A47B 63/00
[58] Field of Search ............ 49/246, 248; 292/263, 292/338, 275; 220/335; 217/60 R, 60 E; 312/319; 16/140, 138; 248/240; 151/14.5

[56] References Cited
UNITED STATES PATENTS

| 650,006 | 5/1900 | Haas | 292/263 |
|---|---|---|---|
| 2,303,452 | 12/1942 | Goserud | 292/263 |
| 2,942,640 | 6/1960 | Lundeberg | 151/14.5 |
| 3,067,886 | 12/1962 | Frederick | 214/11 R |

FOREIGN PATENTS OR APPLICATIONS 286,439  3/1928  United Kingdom ............ 217/60 E Primary Examiner—Kenneth Downey
Attorney, Agent, or Firm—Robert C. J. Tuttle; Edwin W. Uren; Carl Fissell, Jr.

[57] ABSTRACT

A lid providing access to an operating area of a document processor is provided with simplified mechanism for controlling the opening and closing of the lid, and for preventing its accidental closing when in a full or partially opened state, such mechanism requiring but minimal actuating force for opening and closing the lid, and additionally providing for the full and automatic closing of the lid when it is manually actuated to a position proximate its fully closed position.

22 Claims, 8 Drawing Figures

LID CONTROL APPARATUS FOR DOCUMENT PROCESSING EQUIPMENT

BACKGROUND OF THE INVENTION

Historically data processing equipment such as document reader sorters have included a transport guideway leading from a document hopper past a processing station to one or more selectable pockets, and transport apparatus for moving documents at a variety of speeds along the guideway to be sorted and stacked in the pockets. Typically the transport apparatus of such document reader sorters has provided picking and feeding means in the area of the hopper, for thrusting one document at a time into the entranceway of the guideway path, and speed control means for maintaining or accelerating the speed of travel of the documents along the guideway to and away from the processing station. It has been a characteristic of document reader sorters of this type to require periodic and problem-related human intervention, i.e. intervention on the part of the operator for the purpose of intercepting a document or clearing a document jam, or intervention on the part of a repairman for the purpose of correcting a variety of paper-related malfunctions.

In recognition of the need for problem-related intervention on the part of the operator, document reader sorters have long since provided hinged access lids in the areas where such intervention is likely to be required. These access lids have varied widely in size and weight, and have required varying degrees of effort on the part of the operator to effect their opening and closing. Additionally, various means have been employed for supporting the hinged lids in their open positions, including complicated and costly latching devices that tend to favor safety over convenience and economy, and less complicated supporting structures that appear to favor convenience and economy at the risk of operator safety.

Other types of data processing equipment such as check encoding and sorting systems have required operator intervention of a more routine and regular nature. Systems of this type typically include a hopper compartment into which batches of checks are edge stacked for individual withdrawal and processing by the operator, a keyboard for entering the information to be encoded on the checks (as for example in MICR characters), an insert slot adjacent the hopper into which the individual checks are dropped by the operator following the keyboard entry, and transport apparatus for moving the checks along a guideway from the insert slot through a processing station to a selected one of a plurality of pockets, the processing station, located adjacent the keyboard, including an encoding printer and an endorser. In systems of this kind operator access to the processing station is required, not only for the purpose of clearing an occasional jam in the transport guideway, but also, with more predictable frequency, for the purpose of changing the encoding ribbon and advancing the endorser date. For these purposes an access lid is generally provided in the area of the processing station and adjacent the keyboard, the lid being hinged in such manner as to permit ready access by the operator without moving from her normal working location and position.

A need has accordingly been felt for a completely safe and yet economical means for controlling the opening and closing of access lids in document processing equipment of various kinds, which is to say means whereby the access lid may be opened with minimal effort on the part of an attending operator, whereby a fully or partially opened lid will not be susceptible to accidental closing, and whereby the full and automatic closing of the lid is assured when manually closed to a predetermined point short of its fully closed position.

SUMMARY OF THE INVENTION

It is accordingly an object of the present invention to provide a lid control apparatus that is particularly suitable for accommodating the human intervention requirements of document processing equipment of various kinds, and that affords an optimum of convenience to both the operator and the repairman in the performance of their intervening functions.

It is another object of the present invention to provide a lid control apparatus that is economical to manufacture and at the same time safe and reliable in its operation.

Particular objects of the invention are to provide a lid control device that will afford convenient opening of an access lid with the application of minimal effort, that will reliably retain a partially or fully opened lid in its opened position even when accidentally jarred by the operator, and that will afford full and automatic closing of the lid when manually closed to a predetermined point short of its fully closed position.

An important aspect of the present invention is the use of a scissors-like two-arm support in association with a hinged access lid and the frame structure of the document processing apparatus, the free ends of the two-arm support being pivotally connected to the lid and the frame structure, the vertex ends of the arms being adjustably and pivotally connected for frictional variation therebetween, and the adjacent surfaces of the arms in the overlapping vertex area being so configured as to apply and to remove an adjustably selected friction in the overlapping vertex areas as the arms in response to the opening and closing of the lid are arcuately moved between their scissors-closed and scissors-open positions, such adjustably selected friction being removed when the lid is manually actuated between its closed position and a predetermined first angular range, and continuously applied when the lid is manually actuated between a second angular range defined by its fully opened position and the upper limit of said first angular range.

Another important aspect of the invention is the provision at the vertex end of one of the scissors-like arms of a projecting limit member that blockably cooperates with the other of the arms to define the fully opened position of said arms and said access lid.

BRIEF DESCRIPTION OF THE DRAWING

These and other objects, aspects and advantages of the present invention will become more readily apparent from the following description when read in conjunction with the following drawing figures, in which.

DESCRIPTION OF THE PREFERRED EMBODIMENT

Figure 1:
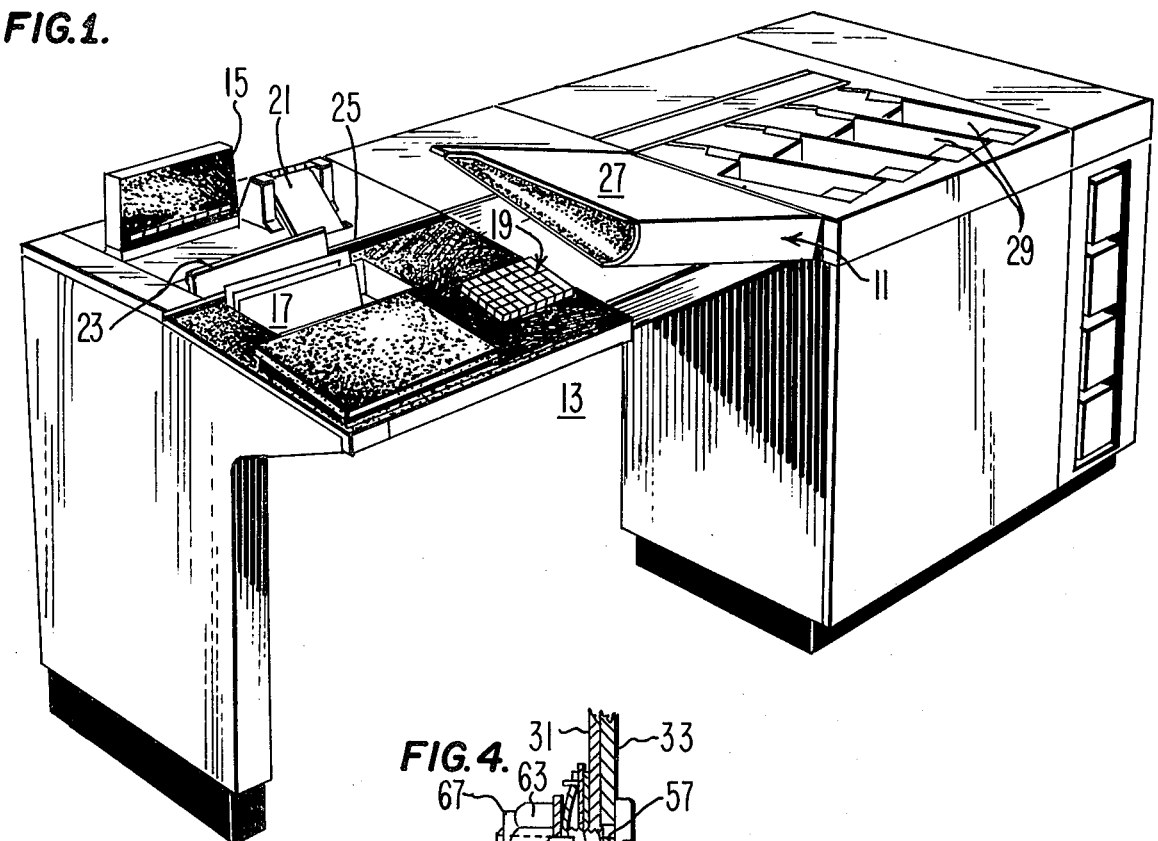
FIG. 1 is a perspective view of a check encoding and sorting system wherein the inventive lid control apparatus finds particular application.
Figure 2:
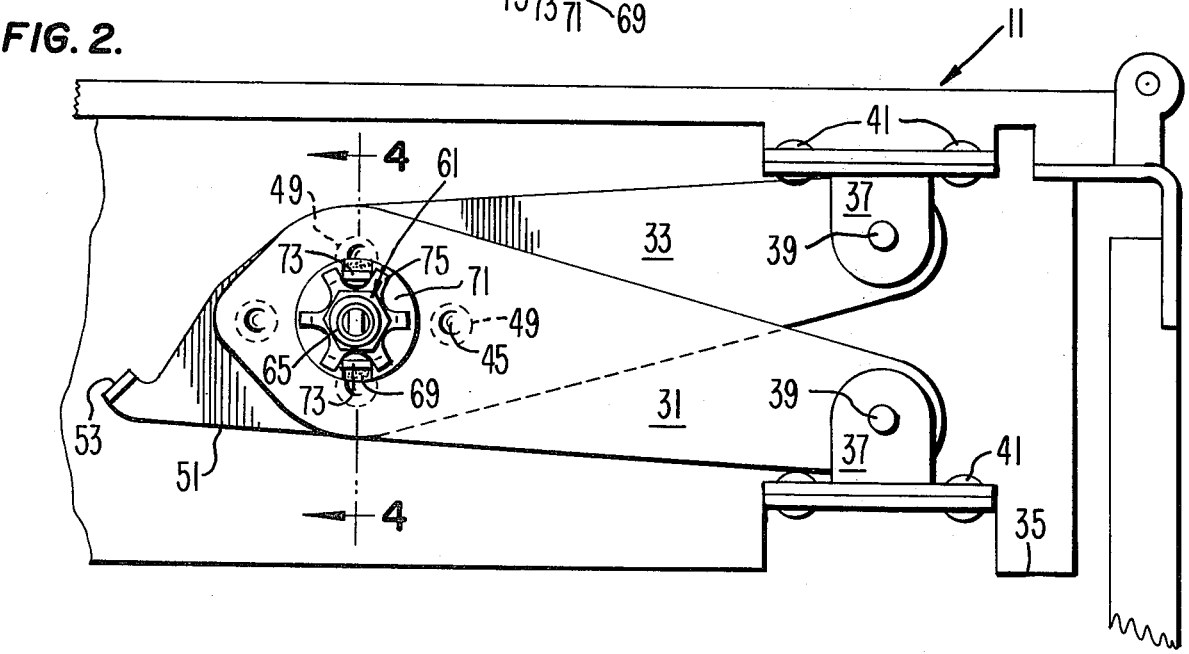
FIG. 2 is a diagrammatic illustration of the inventive scissors-like two-arm support in association with the lid and frame structure of the system illustrated in FIG. 1, the lid being disposed in its closed position.
Figure 3:
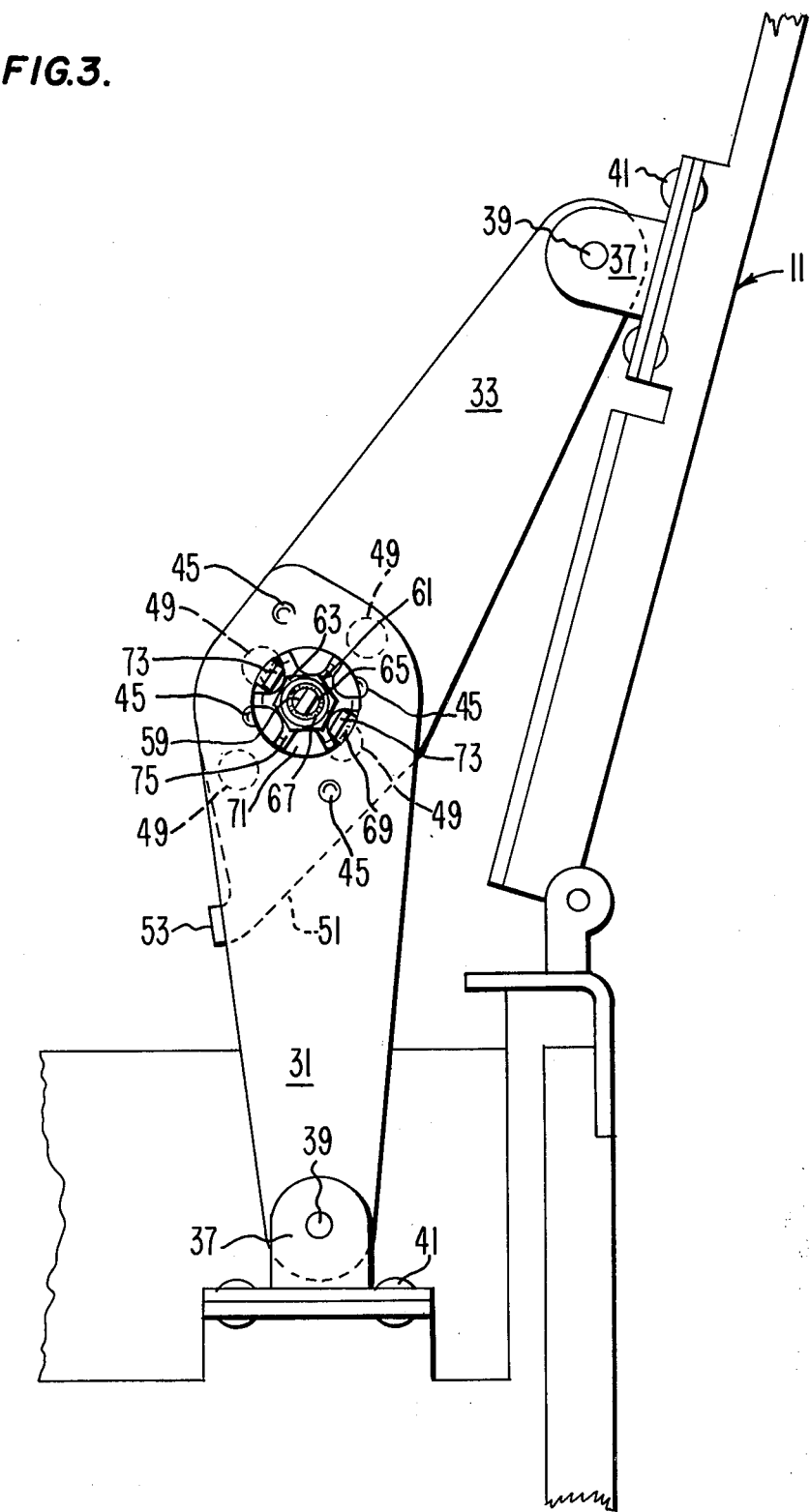
FIG. 3 is a diagrammatic illustration similar to FIG. 2 but with the lid disposed in its fully opened position.
Figure 5:
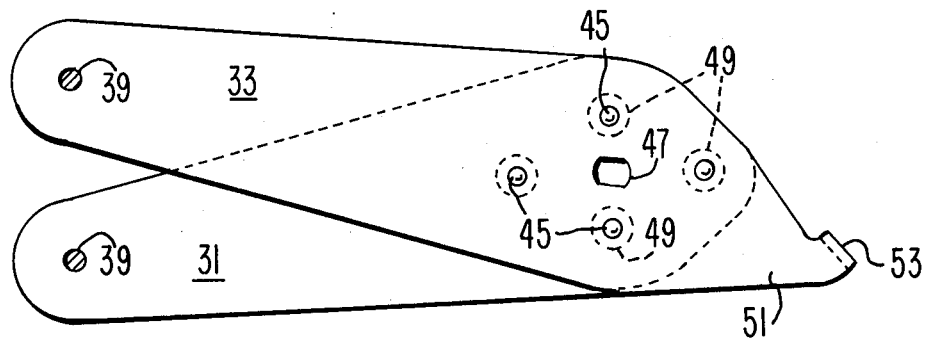
FIG. 5 is a view of the reverse sides of the joined two-arm support opposite the sides illustrated in FIGS. 2 and 3, and showing the relationship of the embossed projections of one arm relative to the apertures of the other arm when the arms are disposed in their scissors-closed position.

The inventive lid control apparatus is illustrated in FIGS. 2 and 3 in association with an access lid of a check encoding and sorting system such as that illustrated in FIG. 1, the access lid, generally designated at 11, being hinged at its right-most edge and tiltably openable from the left side to provide ready access by an attending operator positioned at a work station 13. Check encoding and sorting systems such as that illustrated in FIG. 1 may provide a display panel 15, a hopper compartment 17 into which batches of checks may be edge-stacked by the operator, a keyboard 19 for inputting data to be encoded on the individual checks, a printer 21 for printably accumulating the encoded amounts, an insert slot 23 for entering the individual checks following the keyboard entry, and a transport guideway 25 leading from the insert slot 23 past a processing station generally designated at 27 to a plurality of pockets 29. The processing station 27, which is rendered accessible by means of the previously referenced access lid 11, may be comprised of an encoding printer effective for printing data in MICR characters, and an endorser effective for recording the customary information on the rear or front sides of the checks. In the normal operation of a check encoding and sorting system of this kind, an attending operator situated at the work station 13 would have periodic need of gaining access to the processing station 27, as for example to change the MICR ribbon of the encoding printer and to advance the date of the endorser. To accommodate such periodic access, a hinged access lid such as that illustrated at 11 is commonly provided, such lid being generally hinged at its rightmost edge so that the operator may raise the lid without leaving her position at the work station.

In order to provide the attending operator with maximum convenience in her opening and closing of the lid 11, it has been considered desirable that the lid be rendered openable with the application of minimal force, that it remain in a fully or partially opened position even were it to be accidentally jarred by the operator, and that it close automatically and without the application of force when during the closing thereof it reaches a predetermined point short of its fully closed position. It may, for example, be considered desirable that the lid be openable to a fully opened position of 110° from the horizontal, that a frictional holding force be consistently maintained between its 10° or 15° open position and its fully opened position, and that such frictional holding force be removed when the lid is closed beyond its 10° or 15° open position. It is additionally considered desirable that lid control apparatus associated with access lids be frictionally adjustable according to the size and weight of the lid, so that the required frictional holding force might be applied while at the same time imposing but a minimum force requirement to effectuate opening and closing of the lid.

A lid control apparatus suitable for meeting the above described requirements is illustrated in FIGS. 2–8. As shown in FIGS. 2 and 3, this lid control apparatus is comprised of a pair of scissors-like arms 31 and 33 which are pivotally and frictionally connected at their vertex and respectively connected pivotally to the frame structure 35 of the encoder and to the hinged lid 11. The pivotal connection of the arms to the frame structure 35 and lid 11 may be accomplished in any suitable fashion, such as by means of offset foot members 37 containing pivot pins 39 rotatably disposed within apertures formed in the extremities of the arms 31 and 33. The foot members 37 may be connected to the frame structure 35 and the lid 11 by any suitable fastening means, such as by bolts or screws 41 passing through apertures formed in the foot members.

Figure 6:
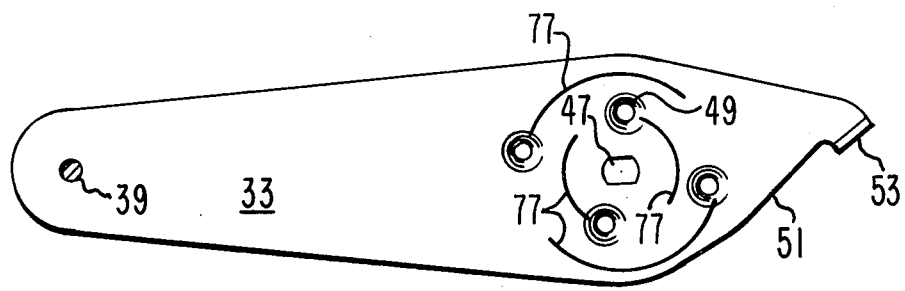
FIG. 6 is a view of the aperture bearing arm separated from the arm bearing the embossed projections, such view showing the paths of travel of the embossed projections relative to their associated apertures during the opening and closing of the lid.
Figure 7:
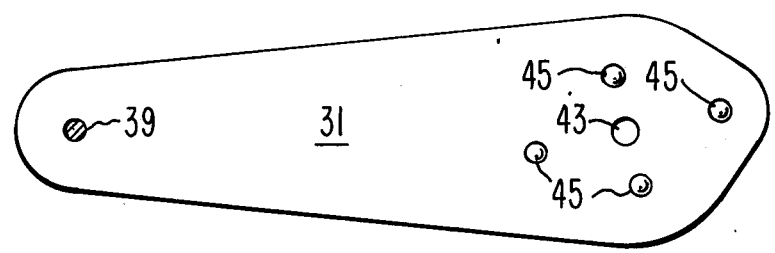
FIG. 7 is a view of the projection bearing arm separated from the aperture bearing arm and showing the embossed projections thereof.

The arm 31, as best illustrated in FIG. 7, is provided with a circular aperture 43 around which a predetermined plurality of embossed projections 45 are symmetrically arranged and disposed at at least two different radii with respect to the aperture. In the preferred embodiment of the invention, four embossed projections 45 are symmetrically arranged on two different radii, as shown in FIG. 7. The arm 33, as best illustrated in FIG. 6, is provided with a flatted circular aperture 47 around which a predetermined plurality of countersunk apertures 49 are symmetrically arranged and disposed at at least two different radii with respect to the flatted circular aperture, the number of countersunk apertures 49 and the number of radii at which they are disposed corresponding to the number of embossed projections and radii employed in the case of the arm 31. Here again the preferred embodiment of the invention provides four countersunk apertures 49 symmetrically arranged along two different radii from the flatted circular aperture 47. The arm 33 may additionally be provided with a vertex extension 51 having an offset projection 53 to define the fully opened position of the lid 11, such projection 53 in cooperation with the edge of the arm 31 serving, for example, to limit the opening of the lid to a 100° angle from the horizontal. The surfaces of the arms 31 and 33 containing the embossed projections 45 and the counter-sunk apertures 49, respectively, are heat treated to Rockwell 50 in order to prevent wear of their surfaces resulting from operation of the lid control apparatus.

Figure 4:
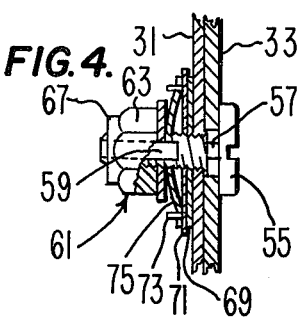
FIG. 4 is a view of the frictionally adjustable connection between the vertex ends of the two-arm support taken along the line 4—4 of FIG. 2.
Figure 8:
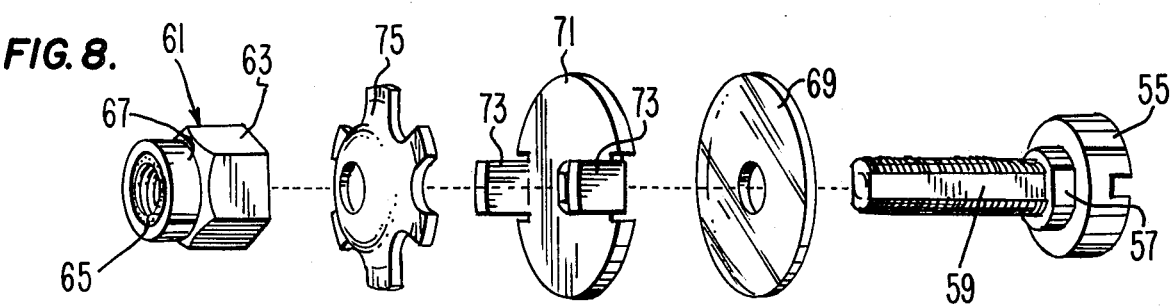
FIG. 8 is an exploded view showing with greater clarity the frictionally adjustable connection illustrated in FIG. 4.

The vertex ends of the arms 31 and 33 are pivotally and frictionally connected to present the arms with a scissors-like configuration, such pivotal and frictional connection being best described with reference to FIGS. 4 and 8. The pivotal connection is effectuated by means of a bolt 55 having a flatted shoulder 57 and a flatted threaded shaft 59, and a nut 61 having threads disposed in an enlarged portion 63 thereof and an elastic internally threaded sleeve 65 disposed in a reduced portion 67 thereof. The frictional connection of the arms 31 and 33 is effected by means of a nylon washer 69, a steel washer 71 having a pair of diametrically opposed offset peripheral lugs 73, and a six-sided radially pronged spring washer 75 having corresponding oppositely disposed pairs of prongs engaged with the offset lugs 73. The nylon washer 69 and spring washer 75 are provided with circular central apertures for receiving the flatted threaded shaft 59, and the steel washer 71 having the pair of offset lugs 73 is provided with a flatted circular aperture conforming to the outer periphery of the flatted threaded shaft 59.

The assembly process for effectuating the pivotal and frictional connection between the scissors-like arms 31 and 33 involves the steps of: (1) inserting the flatted threaded shaft 59 of the bolt 55 into the flatted circular aperture 47 of the arm 33, from the side surface thereof opposite the surface containing the countersunk apertures 49, and such that the flatted shoulder 57 of the bolt 55 is engaged with the flatted circular aperture 47; (2) assembling the arm 31 onto the flatted threaded shaft 59 with the surface containing the embossed projections 45 disposed in adjacent relationship to the surface of the arm 33 containing the countersunk apertures 49; (3) assembling the nylon washer 69 onto the flatted threaded shaft 59; (4) assembling the steel washer 71 onto the flatted threaded shaft 59 such that the flatted circular aperture thereof is engaged therewith, and such that the offset peripheral lugs 73 thereof are directed away from the arm 31; (5) assembling the radially pronged spring washer 75 onto the flatted threaded shaft 59 with the convex configuration of the washer disposed away from the steel washer 71, and such that the peripheral lugs 73 of the steel washer are engaged by the corresponding opposite pairs of radial prongs of the spring washer 75; and (6) turnably assembling the nut 61 onto the flatted threaded shaft 59 of the bolt 55 such that the elastic threaded sleeve 65 contained in the reduced portion 67 thereof is grippably engaged with the threaded shaft 59, and such that the enlarged portion of the nut 63 is disposed in close but non-contacting relationship with the spring washer 75. After having assembled the scissors-like arms 31 and 33 in the above described manner, the offset foot members 37 of the arms may then be assembled to the frame structure 35 and the lid 11 by means of the bolts or screws 41, the foot member 37 of the arm 31 being connected to the frame structure 35 and the foot member 37 of the arm 33 being connected to the access lid 11.

It is to be noted that the above described pivotal and frictional connection between the scissors-like arms 31 and 33 provides adjustable friction producing means that may be called into play after the pivotally connected arms are assembled to the frame structure 35 and to the access lid 11, final adjustment of the friction producing means being accomplished, to thereby compensate for the size and weight of the lid 11, by tightening or loosening the nut 61 on the flatted threaded shaft 59 of the bolt 55. In making this final adjustment to the friction producing means, the desirable characteristics for lid control apparatus described above should be held governing.

It is also to be noted that the size of the countersunk apertures 49 relative to the embossed projections 45 will depend upon the predetermined point during the closing of the lid at which it is desired to remove the friction between the arms 31 and 33 (to permit automatic and full closing of the lid therebeyond), the smaller the countersunk apertures 49 relative to the embossed projections 45 the longer the maintenance of the frictional pressure between the arms during the closing of the lid, and the larger the countersunk apertures 49 relative to the embossed projections 45 the shorter the maintenance of the frictional pressure between the arms during closing and the sooner will the frictional pressure be removed to permit automatic and full closing of the lid. The relative sizes of the countersunk apertures 49 and embossed projections 45 of the preferred embodiment of the invention is substantially illustrated and suggested in FIG. 5, wherein the scissors-like arms 31 and 33 are disposed in their scissors-closed positions.

Operation of the inventive lid control apparatus can best be described with reference to FIGS. 2, 3 and 6, FIG. 2 illustrating the relative positions of the embossed projections 45 of the arm 31 and the countersunk apertures 49 of the arm 33 when the lid 11 is disposed in its fully closed position, FIG. 3 illustrating the relative positions of the embossed projections 45 and countersunk apertures 49 when the lid is disposed in its fully opened position, and FIG. 6 illustrating at 77 the frictional paths of travel of the embossed projections 45 relative to the heat treated surface of the arm 33, and relative also to the countersunk apertures 49. It will be seen, with reference to FIG. 2, that upon initial opening of the lid 11 the embossed projections 45 of the arm 31 will move in a clockwise direction within their corresponding countersunk apertures 49 of the arm 33, without applying any frictional force between the arms. At a predetermined early point in the opening of the lid 11 the embossed projections 45 will contact the inclined slopes of the counterbores of the apertures 49 and assume a clockwise-moving friction applying position relative to the adjacent surface of the arm 33 (conforming to the paths of travel 77 illustrated in FIG. 6), the friction applying pressure remaining constant throughout the opening movement of the lid. This same friction applying pressure will also be maintained during the closing movement of the lid, until the embossed projections 45 re-enter the counterbores of their corresponding apertures 49, when the pressure is removed and the lid 11 is permitted to move freely and through gravitational force to its fully closed position. It will therefore be apparent that the lid 11 may be opened to any desired access position within the previously described 110° range, that the lid by reason of the friction applying pressure between the arms 31 and 33 will remain in such access position even though it be accidentally jarred by the operator, and that at a predetermined point in the lid's closing movement, the friction applying pressure between the arms will be removed with the lid thereafter returning freely to its fully closed position.

Although a preferred embodiment of the inventive lid control apparatus has been described in considerable detail, it will be apparent that various modifications and alterations therein, and particularly with respect to the arrangement and size of the embossed projections and countersunk apertures of the two arms, may be made by those having ordinary skill in the art without departing from the true spirit and scope of the invention, it being intended that such spirit and scope be limited only by the appended claims.

What is claimed is:

1. In document processing apparatus wherein documents are transported from a hopper compartment through a processing station to a stacker compartment, and wherein a hinged lid is provided for gaining access to said processing station for the performance of manual functions, improved lid control mechanism responsive to minimal opening and closing force and effective for positionably holding said lid when moved to a partially or fully opened position and for permitting the gravitational closing of said lid when closably moved to a predetermined point short of is fully closed position, said mechanism comprising:
   a. a pair of pivotally interconnected arms pivotally connected to said lid and to the frame structure of said document processing apparatus, the pivotal interconnection of said pair of arms being accommodated by a threaded bolt received within central apertures formed in the vertex ends of said arms and a nut secureably engaged with the threaded shaft of said bolt, the secureable engagement being effected by means of an elastic internally threaded sleeve coaxially disposed of the internal threads of said nut and housed within the outer configuration of said nut, said elastic sleeve having an inner diameter slightly less than the inner diameter presented by said internal threads of said nut,
   b. vertex friction applying means associated with said pivotal interconnection of said pair of arms and effective for positionably holding said lid when moved with minimal opening force to a partially or fully opened position, said vertex friction applying means defined to include,
      i. a plurality of embossed projections extending from a side surface of a first of said arms in symmetrical arrangement relative to said central aperture formed in said vertex end thereof, and
      ii. yieldable spring means positioned by said bolt and disposed intermediate said nut and a side surface of one of said arms, said spring means being effective for applying a selectable frictional force between said embossed projections of said first arm and an adjacent side surface of a second of said arms when said lid is openably moved a predetermined distance away from its fully closed position, and
   c. vertex friction relieving means associated with said friction applying means and effective for permitting the gravitational closing of said lid when closably moved to a predetermined point short of its fully closed position.

2. The lid control mechanism defined in claim 1 wherein said yieldable spring means positioned by said bolt and said nut comprises:
   a. a nylon washer disposed adjacent said side surface of said one arm,
   b. a radially pronged convexly configured spring washer disposed adjacent said nut with the convex contour thereof in abutting relationship therewith, and
   c. a steel washer disposed intermediate said nylon washer and the prongs of said spring washer.

3. The lid control mechanism defined in claim 2 wherein said threaded bolt is provided with a flatted shoulder and is cut-away on opposite sides to present a flatted threaded shaft, and wherein said bolt and said yieldable spring means are prevented from rotating relative to one of said pair of arms by means of:
   a. a flatted configuration provided said central aperture formed in the vertex end of said one arm, the flatted aperture so presented being engaged by said flatted shoulder of said threaded bolt, and
   b. a flatted circular aperture formed in said steel washer of said yieldable spring means, said flatted aperture being engaged by said flatted threaded shaft of said bolt.

4. In document processing apparatus wherein documents are transported from a hopper compartment through a processing station to a stacker compartment and wherein a hinged lid is provided for gaining access to said processing station for the performance of manual functions, improved lid control mechanism responsive to minimal opening and closing force and effective for positionably holding said lid when moved to a partially or fully opened position and for permitting the gravitational closing of said lid when closably moved to a predetermined point short of its fully closed position, said mechanism comprising:
   a. a pair of pivotally interconnected arms pivotally connected to said lid and to the frame structure of said document processing apparatus, the pivotal interconnection of said pair of arms being accommodated by a threaded bolt received within central apertures formed in the vertex ends of said arms and a nut secureably engaged with the threaded shaft of said bolt,
   b. vertex friction applying means associated with said pivotal interconnection of said pair of arms and effective for positionably holding said lid when moved with minimal opening force to a partially or fully opened position, said vertex friction applying means defined to include,
      i. a plurality of embossed projections extending from a side surface of a first of said arms in symmetrical arrangement relative to said central apertures formed in said vertex end thereof, and
      ii. yieldable spring means positioned by said bolt and disposed intermediate said nut and a side surface of one of said arms, said spring means being effective for a selectable frictional force between said embossed projections of said first arm and an adjacent side surface of a second of said arms when said lid is openably moved a predetermined distance away from its fully closed position, said yieldable spring means further defined to include,
         A. a nylon washer disposed adjacent said side surface of one arm,
         B. a radially pronged convexly configured spring washer disposed adjacent said nut with the convex contour thereof in abutting relationship therewith, and
         C. a steel washer disposed intermediate said nylon washer and the prongs of said washer, said radially pronged spring washer being prevented from rotating relative to said steel washer by a pair of peripherally and oppositely disposed offset lugs formed on said steel washer, said lugs being engaged by corresponding pairs of prongs of said spring washer.

5. In document processing apparatus wherein documents are transported from a hopper compartment through a processing station to a stacker compartment, and wherein a hinged lid is provided for gaining access to said processing station for the performance of manual functions, improved lid control mechanism responsive to minimal opening and closing force and effective for positionably holding said lid when moved to a partially or fully opened position and for permitting the gravitational closing of said lid when closably moved to a predetermined point short of its fully closed position, said mechanism comprising:

a. a pair of pivotally interconnected arms pivotally connected to said lid and to the frame structure of said document processing apparatus, said pivotal interconnection of said pair of arms being accommodated by a threaded bolt received within central apertures formed in the vertex ends of said arms and a nut secureably engaged with the threaded shaft of said bolt, b. vertex friction applying means associated with said pivotal interconnection of said pair of arms and effective for positionably holding said lid when moved with minimal opening force to a partially or fully opened position, said vertex friction applying means including:

i. a plurality of embossed projections extending from a side surface of a first of said arms in symmetrical arrangement relative to said central aperture formed in said vertex end thereof, and ii. yieldable spring means positioned by said bolt and disposed intermediate said nut and a side surface of one of said arms, said spring means being effective for applying a selectable frictional force between said embossed projections of said first arm and an adjacent side surface of a second of said arms when said lid is openably moved a predetermined distance away from its fully closed position, c. vertex friction relieving means associated with said friction applying means and effective for permitting the gravitational closing of said lid when closably moved to a predetermined point short of its fully closed position, said vertex friction relieving means being defined to include a plurality of well-like depressions formed in the side surface of said second arm adjacent said embossed projections of said first arm and in symmetrical arrangement relative to said central aperture formed in said vertex end of said second arm, said plurality corresponding in number to the plurality of embossed projections of said first arm, said embossed projections of said first arm being arcuately displaced from said well-like depressions of said second arm to produce a frictional lid holding force between said pair of arms in response to said yieldable spring means when said lid is partially or fully opened, the coincidence of said embossed projections of said first arm with said well-like depressions of said second arm when said lid is closably activated beyond said predetermined point short of its fully closed position serving to relieve said frictional lid holding force between said pair of arms and to permit the gravitational closing of said lid.

6. The lid control mechanism defined in claim 5 wherein said symmetrically arranged well-like depressions formed in said second arm are disposed at at least two radii relative to said central aperture formed in the vertex end of said second arm.

7. The lid control mechanism defined in claim 5 wherein said well-like depressions formed in said second arm are countersunk apertures having the inclined slopes thereof disposed in cooperable relationship with said embossed projections of said first arm.

8. The lid control mechanism defined in claim 7 wherein said predetermined point during the closing of said lid beyond which said lid is permitted to gravitationally close may be varied by increasing or decreasing the diametric dimension of said countersunk apertures in said second arm relative to the diametric dimension of said embossed projections of said first arm, increasing said dimension of said countersunk apertures relative to said embossed projections serving to shift said predetermined point away from the lid's fully closed position, and decreasing said dimension of said countersunk apertures relative to said embossed projections serving to shift said predetermined point toward the lid's fully closed position.

9. Adjustable lid control apparatus for holding a hinged lid of a container in a partially or fully opened position, and for permitting the gravitational closing of the lid when closably activated to a predetermined point short of its fully closed position, said control apparatus comprising:

a. a pair of pivotally interconnected support members pivotally connected to said lid and to said container, said pivotal interconnection of said pair of support members being accommodated by a threaded bolt received within central apertures formed in the vertex ends of said support members and a nut secureably engaged with the threaded shaft of said bolt, the secureable engagement of said nut with said bolt being effectuated by means of an elastic internally threaded sleeve coaxially disposed of the internal threads of said nut and housed within the outer configuration of said nut, said elastic sleeve having an inner diameter slightly less than the inner diameter presented by said internal threads of said nut, b. friction applying means associated with the pivotal interconnection of said pair of support members and effective for positionably holding said lid when moved to a partially or fully opened position, said vertex friction means being defined to include, i. a plurality of embossed projections extending from a side surface of a first of said arms in symmetrical arrangement relative to said central aperture formed in said vertex end thereof, and ii. yieldable spring means positioned by said bolt and disposed intermediate said nut and a side surface of one of said arms, said spring means being effective for applying a selectable frictional force between said embossed projections of said first arm and an adjacent side surface of a second of said arms when said lid is openably moved a predetermined distance away from its fully closed position, and c. friction relieving means associated with said friction applying means and effective for permitting the gravitational closing of said lid when closably moved to a predetermined point short of its fully closed position.

10. The lid control apparatus defined in claim 9 wherein said yieldable spring means positioned by said bolt and said nut comprises:

a. a nylon washer disposed adjacent said side surface of said one support member, b. a radially pronged convexly configured spring washer disposed adjacent said nut with the convex contour thereof in abutting relationship therewith, and c. a steel washer disposed intermediate said nylon washer and the prongs of said spring washer.

11. The lid control apparatus defined in claim 10 wherein said selectable frictional force applied by said spring means between said embossed projections of said first support member and said adjacent side surface of said second support member may be varied to accommodate hinged lids of varying weights by adjustably rotating said nut on said threaded shaft of said bolt to thereby apply a varying abuttable pressure against said radially pronged spring washer.

12. The lid control apparatus defined in claim 10 wherein said threaded bolt is provided with a flatted shoulder and is cut-away on opposite sides to present a flatted threaded shaft, and wherein said bolt and said yieldable spring means are prevented from rotating relative to one of said pair of support members by means of:
   a. a flatted configuration provided in said central aperture formed in the vertex end of said one support member, the flatted aperture so presented being engaged by said flatted shoulder of said threaded bolt, and
   b. a flatted circular aperture formed in said steel washer of said yieldable spring means, said flatted aperture being engaged by said flatted threaded shaft of said bolt.

13. Adjustable lid control apparatus for holding a hinged lid of a container in a partially or fully opened position, and for permitting the gravitational closing of the lid when closably activated to a predetermined point short of its fully closed position, said control apparatus comprising:
   a. a pair of pivotally interconnected support members pivotally connected to said lid and to said container, said pivotal interconnection of said pair of support members being accommodated by a threaded bolt received within central apertures formed in the vertex ends of said support members and a nut secureably engaged with the threaded shaft of said bolt, the secureable engagement of said nut with said bolt being effectuated by means of an elastic internally threaded sleeve coaxially disposed of the internal threads of said nut and housed within the outer configuration of said nut, said elastic sleeve having an inner diameter slightly less than the inner diameter presented by said internal threads of said nut,
   b. friction applying means associated with the pivotal interconnection of said pair of support members and effective for positionably holding said lid when moved to a partially or fully opened position, said friction applying means defined to include,
      i. a plurality of embossed projections extending from a side surface of a first of said support members in symmetrical arrangement relative to said central aperture formed in said vertex end thereof, and
      ii. yieldable spring means positioned by said bolt and disposed intermediate said nut and a side surface of one of said support members, said spring means being effective for applying a selectable frictional force between said embossed projections of said first support member and an adjacent side surface of a second of said support members when said lid is openably moved a predetermined distance away from its fully closed position, said yieldable spring means defined to include,
         A. a nylon washer disposed adjacent said side surface of said one support member,
         B. a radially pronged convexly configured spring washer disposed adjacent said nut with the convex contour thereof in abutting relationship therewith, and
         C. a steel washer disposed intermediate said nylon washer and the prongs of said spring washer, said radially pronged spring washer being prevented from rotating relative to said steel washer by a pair of peripherally and oppositely disposed offset lugs formed on said steel washer, said lugs being engaged by corresponding pairs of prongs of said spring washer, and
   c. friction relieving means associated with said friction applying means and effective for permitting the gravitational closing of said lid when closably moved to a predetermined point short of its fully closed position.

14. Adjustable lid control apparatus for holding a hinged lid of a container in a partially or fully opened position, and for permitting the gravitational closing of the lid when closably activated to a predetermined point short of its fully closed position, said control apparatus comprising:
   a. a pair of pivotally interconnected support members pivotally connected to said lid and to said container, said pivotal interconnection of said pair of support member being accommodated by a threaded bolt received within central formed in the vertex ends of said support members and a nut secureably engaged with the threaded shaft of said bolt,
   b. friction applying means associated with the pivotal interconnection of said pair of support members and effective for positionably holding said lid when moved to a partially or fully opened position, said friction applying means being defined to include,
      i. a plurality of embossed projections extending from a side surface of a first of said support members in symmetrical arrangement relative to said central aperture formed in said vertex end thereof, and
      ii. yieldable spring means positioned by said bolt and disposed intermediate said nut and a side surface of one of said support members, said spring means being effective for applying a selectable frictional force between said embossed projections of said first support member and an adjacent side surface of a second of said support members when said lid is openably moved a predetermined distance away from its fully closed position, and
   c. friction relieving means associated with said friction applying means and effective for permitting the gravitational closing of said lid when closably moved to a predetermined point short of is fully closed position, the friction relieving means being defined to include, a plurality of well-like depressions formed in the side surface of said second support member adjacent said embossed projections of said first support member and in symmetrical arrangement relative to said central aperture formed in said vertex end of said second support member, said plurality corresponding in number to the plurality of embossed projections of said first support member, said embossed projections of said first support member being arcuately displaced from said well-like depressions of said second support member to produce a frictional lid holding force between said pair of support members in response to said yieldable spring means when said lid is partially or fully opened, the coincidence of said embossed projections of said first support member with said well-like depressions of said second support member when said lid is closably activated beyond said predetermind point short of said fully closed position serving to relieve said frictional lid holding force between said pair of support members and to permit the gravitational closing of said lid.

15. The lid control apparatus defined in claim 14 wherein said symmetrically arranged well-like depressions formed in said second support member are disposed at at least two radii relative to said central aperture formed in the vertex end of said second support member.

16. The lid control apparatus defined in claim 14 wherein said well-like depressions formed in said second support member are countersunk apertures having the inclined slopes thereof disposed in cooperative relationship with said embossed projections of said first support member.

17. The lid control apparatus defined in claim 16 wherein said predetermined point during the closing of said lid beyond which said lid is permitted to gravitationally close may be varied by increasing or decreasing the diametric dimension of said countersunk apertures in said second support member relative to the diametric dimension of said embossed projections of said first support member, increasing said dimension of said countersunk apertures relative to said countersunk apertures relative to said embossed projections serving to shift said predetermined point away from the lid's fully closed position, and decreasing said dimension of said countersunk apertures relative to said embossed projections serving to shift said predetermined point toward the lid's fully closed position.

18. Adjustable apparatus for secureably holding an arcuately movable first object within a predetermined range of angular positions relative to a stationary second object to which said first object is pivotally connected, said appartus comprising:
 a. a pair of pivotally interconnected support members pivotally connected to said movable first object and to said stationary second object, and
 b. friction applying means associated with the pivotal interconnection of said pair of support members and effective for secureably holding said first object when moved to a position falling within said predetermined range of angular positions, said friction applying means including, a plurality of embossed projections extending from a side surface of a first of said support members in symmetrical arrangement relative to a central aperture formed in the end thereof pivotally interconnected with a second of said pair of support members, and yieldable spring means associated with the pivotal interconnection between said pair of support members and effective for applying a selective frictional force between said embossed projections of said first support member and an adjacent side surface of said second support member, said pivotal interconnection of said pair of support members being accommodated by a threaded bolt received within said central aperture of said first support member and within a central aperture formed in the end of said second support member pivotally interconnected with said first support member, and a nut secureably engaged with the threaded shaft of said bolt, said bolt and said nut serving to position said yieldable spring means adjacent a side surface of one of said pair of support members, the secureable engagement of said nut with said bolt being effectuated by means of an elastic internally threaded sleeve coaxially disposed of the internal threads of said nut and housed within the outer configuration of said nut, said elastic sleeve having an inner diameter slightly less than the inner diameter presented by said internal threads of said nut.

19. The adjustable apparatus defined in claim 18 wherein said yieldable spring means comprises:
 a. a nylon washer disposed adjacent said side surface of said one of said pair of support members,
 b. a radially pronged convexly configured spring washer disposed adjacent said nut with the convex contour thereof in abutting relationship therewith, and
 c. a steel washer disposed intermediate said nylon washer and the prongs of said spring washer.

20. The adjustable apparatus defined in claim 19 wherein said selectable frictional force applied by said yieldable spring means between said embosssed projections of said first support member and said adjacent side surface of said second support member may be varied to accommodate movable first objects of various weights by adjustably rotating said nut on said threaded shaft of said bolt to thereby apply a varying abuttable pressure against said radially pronged spring washer.

21. The adjustable apparatus defined in claim 19 wherein said threaded bolt is provided with a flatted shoulder and is cut-away on opposite sides to present a flatted threaded shaft, and wherein said bolt and said yieldable spring means are prevented from rotating relative to one of said support members by means of:
 a. a flatted configuration provided said central aperture formed in said first support member, the flatted aperture so presented being engaged by said flatted shoulder of said threaded bolt, and
 b. a flatted circular aperture formed in said steel washer of said yieldable spring means, said flatted aperture being engaged by said flatted threaded shaft of said bolt.

22. Adjustable apparatus for secureably holding an arcuately movable first object within a predetermined range of angular positions relative to a stationary second object to which said first object is pivotally connected, said apparatus comprising:
 a. a pair of pivotally interconnected support members pivotally connected to said movable first object and to said stationary second object, and
 b. friction applying means associated with the pivotal interconnection of said pair of support members and effective for secureably holding said first object when moved to a position falling within said predetermined range of angular positions, said friction applying means including a plurality of embossed projections extending from a side surface of a first of said support members in symmetrical arrangement relative to a central aperture formed in the end thereof pivotally interconnected with a second of said pair of support members, and yieldable spring means associated with the pivotal interconnection between said pair of support members and effective for applying a selectable frictional force between said embossed projections of said first support member and an adjacent side surface of said second support member, said pivotal interconnection of said pair of support members being accommodated by a threaded bolt receiving within said central aperture of said first support member and within a central aperture formed in the end of said second support member pivotally interconnected with said first support member, and a nut secureably engaged with the threaded shaft of said bolt, said bolt and said nut serving to position said yieldable spring means adjacent a side surface of one of said pair of support members, said yieldable spring means being defined to include, i. a nylon washer disposed adjacent said side surface of said one of said pair of support members, ii. a radially pronged convexly configured spring washer disposed adjacent said nut with the convex contour thereof in abutting relationship therewith, and iii. a steel washer disposed intermediate said nylon washer and the prongs of said spring washer, said radially pronged spring washer being prevented from rotating relative to said steel washer by a pair of peripherally and oppositely disposed offset lugs formed on said steel washer, said lugs being engaged by corresponding pairs of prongs of said spring washer.

* * * * *